(12) United States Patent
Mattson et al.

(10) Patent No.: US 9,348,966 B2
(45) Date of Patent: May 24, 2016

(54) BLEND BEHAVIOR IN A VARIATIONAL SYSTEM

(75) Inventors: Howard Charles Duncan Mattson, Impington (GB); Douglas Joseph King, Peterborough (GB); Paul Jonathan Sanders, Cambridge (GB); Jeffrey A. Walker, Huntsville, AL (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 540 days.

(21) Appl. No.: 13/617,389

(22) Filed: Sep. 14, 2012

(65) Prior Publication Data

US 2014/0012410 A1    Jan. 9, 2014

Related U.S. Application Data

(60) Provisional application No. 61/668,794, filed on Jul. 6, 2012.

(51) Int. Cl.
*G06F 17/50* (2006.01)
*G06T 19/20* (2011.01)

(52) U.S. Cl.
CPC ............ *G06F 17/5086* (2013.01); *G06F 17/50* (2013.01); *G06T 19/20* (2013.01); *G06F 2217/06* (2013.01); *G06T 2219/2021* (2013.01)

(58) Field of Classification Search
CPC . G06F 17/5086; G06F 2217/60; G06F 17/50; G06F 2217/06; G06T 19/20; G06T 2219/2021
USPC .............................................. 703/1; 345/442
See application file for complete search history.

(56) References Cited

U.S. PATENT DOCUMENTS

| 6,181,978 B1 * | 1/2001 | Hinds ..................... G06T 17/20 700/182 |
| 2009/0201295 A1* | 8/2009 | Kripac et al. .................. 345/442 |
| 2010/0231587 A1* | 9/2010 | Mawby ................... G06T 17/00 345/420 |
| 2013/0124149 A1* | 5/2013 | Carr ........................ G06F 17/50 703/1 |

OTHER PUBLICATIONS

Chandru, Vijaya et al., "Variable Radius Blending Using Dupin Cyclides", Jan. 1990, School of Industrial Engineering, Purdue University.*
Pratt, Michael J. et al "Towards the Standardized Exchange of Parameterized Feature-Based CAD Models", 2005, Computer-Aided Design 37, Elsevier Ltd.*
Lee, Jae Yeol et al., "A 2-D Geometric Constraint Solver Using DOF-Based Graph Reduction", 1998, Computer-Aided Design, vol. 30, No. 11, Elsevier Science Ltd.*

(Continued)

*Primary Examiner* — Kamini S Shah
*Assistant Examiner* — Cedric D Johnson

(57) ABSTRACT

Methods for product data management and corresponding systems and computer-readable mediums. A method includes receiving a CAD model in the data processing system, the CAD model including at least a first blend that has an axis, a radius measured from the axis, and a plurality of unders. The method includes receiving a change to the radius of the first blend and selectively designating either the axis as fixed or the unders as fixed according to a property of the blend. The method includes modifying the CAD model by changing the radius according to the received change and the designated fixed axis or designated fixed unders, and storing the modified CAD model.

20 Claims, 4 Drawing Sheets

(56) References Cited

OTHER PUBLICATIONS

Bouma, W. et al: "Geometric Constraint Solver", Computer Aided Design, Elsevier Publishers BV., Barking, GB, vol. 27, No. 6, Jun. 1, 1995, pp. 487-501, XP004022786, ISSN: 0010-4485, DOI: 10.1016/ 0010-4485(94)00013-4 abstract p. 488, col. 1, paragraph 2-6; p. 496, col. 1, paragraph 1; 497, col. 1, last paragraph; p. 499, col. 1, paragraph 2; figure 19 (16 pages).

PCT Search Report dated Aug. 19, 2013, for Appl. No. PCT/US2013/049235. (15 pages).

* cited by examiner

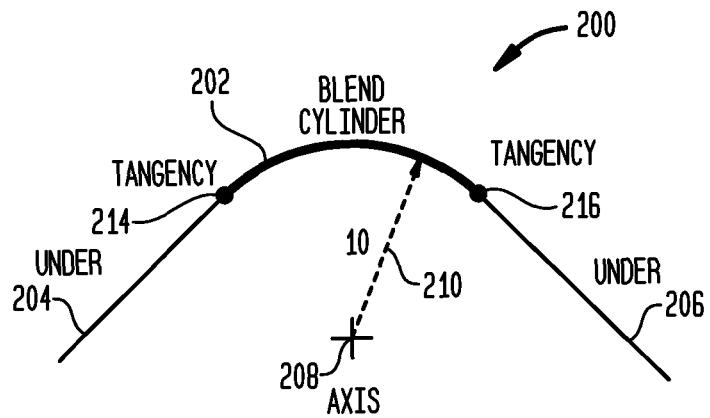
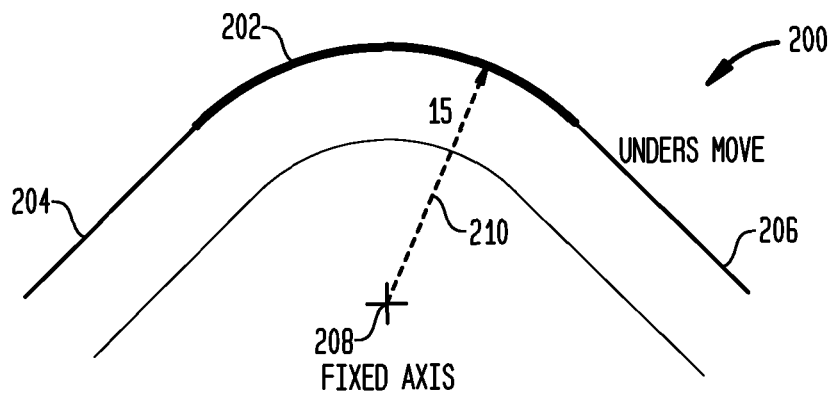
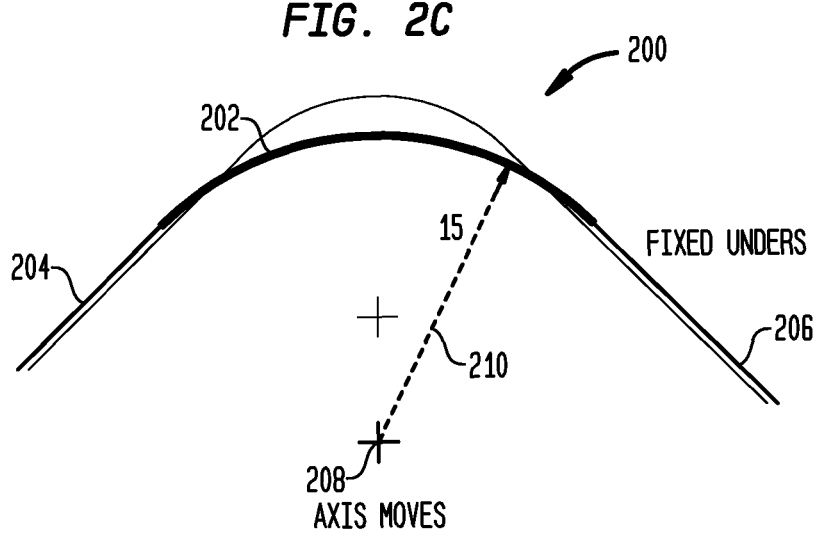

BLEND BEHAVIOR IN A VARIATIONAL SYSTEM

CROSS-REFERENCE TO OTHER APPLICATIONS

This application claims the benefit of the filing data of U.S. Provisional Patent Application 61/668,794, filed Jul. 6, 2012, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for product data management, corresponding systems, and computer-readable mediums. A method includes receiving a CAD model in the data processing system, the CAD model including at least a first blend that has an axis, a radius measured from the axis, and a plurality of unders. The method includes receiving a change to the radius of the first blend and selectively designating either the axis as fixed or the unders as fixed according to a property of the blend. The method includes modifying the CAD model by changing the radius according to the received change and the designated fixed axis or designated fixed unders, and storing the modified CAD model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 2A-C show a simple two-dimensional (2D) model used to illustrate an edit including a blend face;

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Within a variational modeling system, such as the "Synchronous Technology" processes used in Siemens Product Lifecycle Management Software, Inc. products, changes are generally expressed variationally. A variational system describes the parameters of and relationships between features in an object model in terms of geometric constraints and dimensions. Such systems then use a "solver" process to process these constraints and dimensions, along with a multitude of ancillary constraints and dimensions required to maintain design intent, and the entire model is solved simultaneously.

In such a variational modeling system, it is common for the changing model to include smooth "blend" faces. When these blend faces are analytic (cylinder or torus) there is a choice of how they are solved and therefore displayed and maintained in the final resulting model. Disclosed embodiments include systems and methods for determining the correct technique for solving the blend face.

Figure 1:
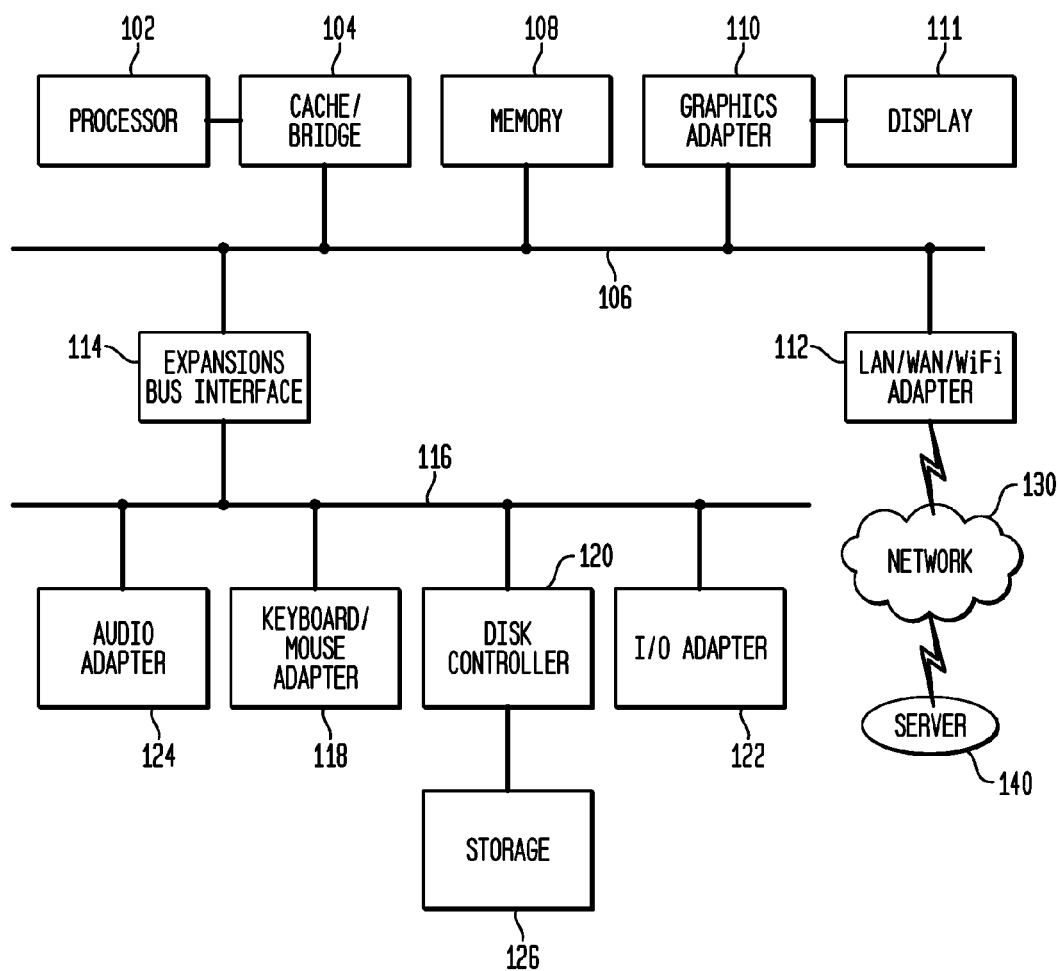
FIG. 1 depicts a block diagram of a data processing system in which an embodiment can be implemented.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIGS. 2A-C show a simple two-dimensional (2D) model used to illustrate an edit including a blend face. FIG. 2A shows a model 200 that includes a cylinder blend 202. The key elements are the "unders", which are the surfaces 204 and 206 that support the blend, the blend cylinder 202, its axis 208, its radius 210 and the tangency conditions 214 and 216 between the blend its respective unders. The starting radius is 10.

Consider a request or edit by a user to increase the radius of the blend. There are two general solutions.

FIG. 2B illustrates a fixed axis solution for model 200. In this case, the radius 210 is increased to 15, and blend 202 is moved outward and the model re-solved accordingly. Unders 204 and 206 move to retain their tangency with blend 202. The axis 208 does not move.

FIG. 2C illustrates a fixed unders solution for model 200. In this case, the radius 210 is increased to 15 by moving axis 208, and blend 202 is re-solved. Unders 204 and 206 do not move, maintaining their general orientation and positions. Axis 208 has moved so as to maintain the tangency to the fixed unders. The points of tangency are calculated as the intersection of the fixed unders with the changed cylinder.

Both solutions are valid but a user might expect different solutions in different circumstances. Disclosed techniques enable the system to automatically choose the correct solution much of the time according to objective properties.

FIGS. 3A-3E illustrate properties used to determine a blend modification and solve method in accordance with disclosed embodiments. A "property", as used herein, refers to the geometric relationships that the target blend has with other features of the model that provide an indication as to whether the axis should be fixed or movable in an operation to change the radius of the blend.

Figure 3A:
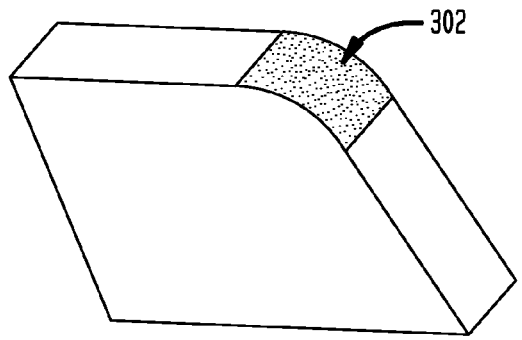
FIGS. 3A-3E illustrate properties used to determine a blend modification and solve method in accordance with disclosed embodiments.

FIG. 3A illustrates a simple blend property. The basic simple blend 302 would generally be expected to move axis, as it is seen as a finishing detail that should not drive its unders.

Figure 3B:
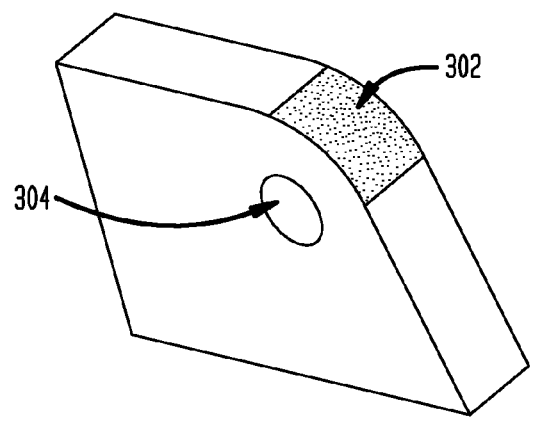

FIG. 3B illustrates a qualifying relations property. When the blend 302 is constrained to a concentric hole 304, it is likely that the axis location becomes more important and so it would be better to move the unders so the axis can remain fixed.

This generalized to a set of "qualifying relations" properties, whose presence adds weight to keeping the axis fixed. These would include most of the standard dimensions and constraints that are influenced by axis location—for example: concentric, distance, offset, symmetry, pattern, etc.

Figure 3C:
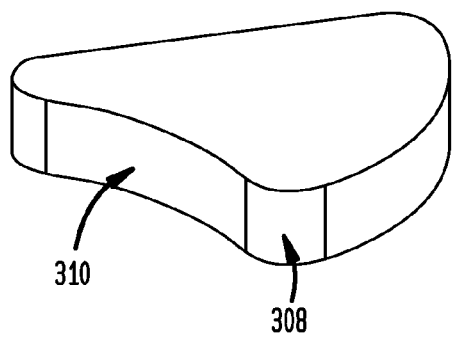

FIG. 3C illustrates a size property. In model 306 there are neighboring blends 308 (the smaller blend) and 310 (the larger blend) so they are unders of each other, referred to herein as "mutually dependent".

Generally the smaller blends, such as blend 308, would be expected to move axis while the larger ones, such as blend 310, remain fixed. This corresponds to the larger cylinders being more like major design elements and the smaller blends being more like finishing details. So, when changing the "small" blend's radius, it should move axis, and when changing the "large" blend's radius, it should keep its axis fixed.

Figure 3D:
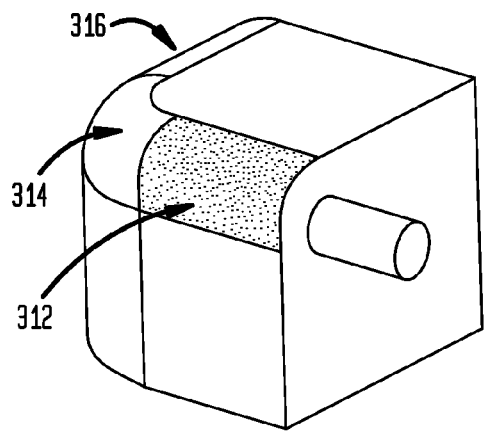

FIG. 3D illustrates a chain property. In this model the blend 312 is part of a "chain" of blends, including blends 314 and 316, which must all change radius together to produce any useful result. This suggests that the unders should remain fixed; otherwise all the unders of the chain would need to move, which, even if successful, is likely to produce a much more drastic change than desired. So on balance, the presence of the chain adds weight to the fixed under solution.

Figure 3E:
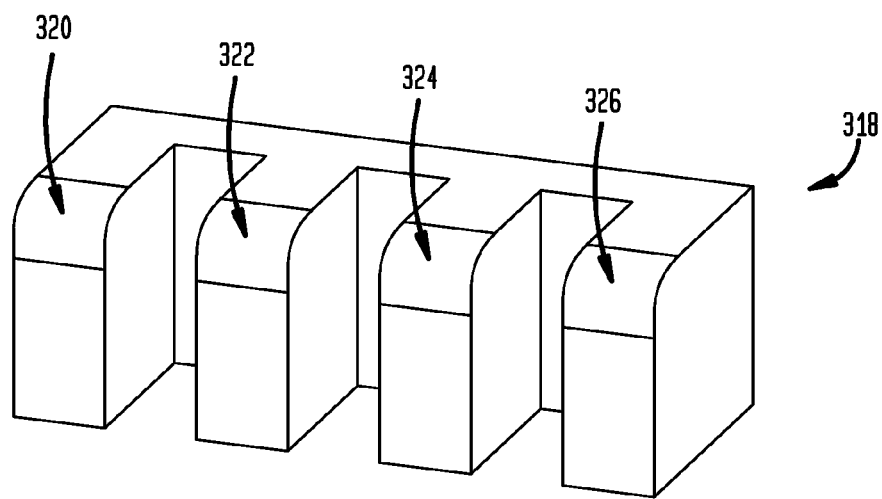

FIG. 3E illustrates a behavior group property. In addition to chains, there are a number of constraints that may link together blends and so require them all to be treated in the same way. In model 318, blends 320, 322, 324, and 326 may be classified as identical, same axis, equal radius, or otherwise, and so constitute a "behavior group". Other behavior groups may include symmetry, pattern, offset, and others.

Various embodiments can also consider an "override". An override enables a user to explicitly and persistently mark a blend as fixed axis or fixed unders.

Figure 4:
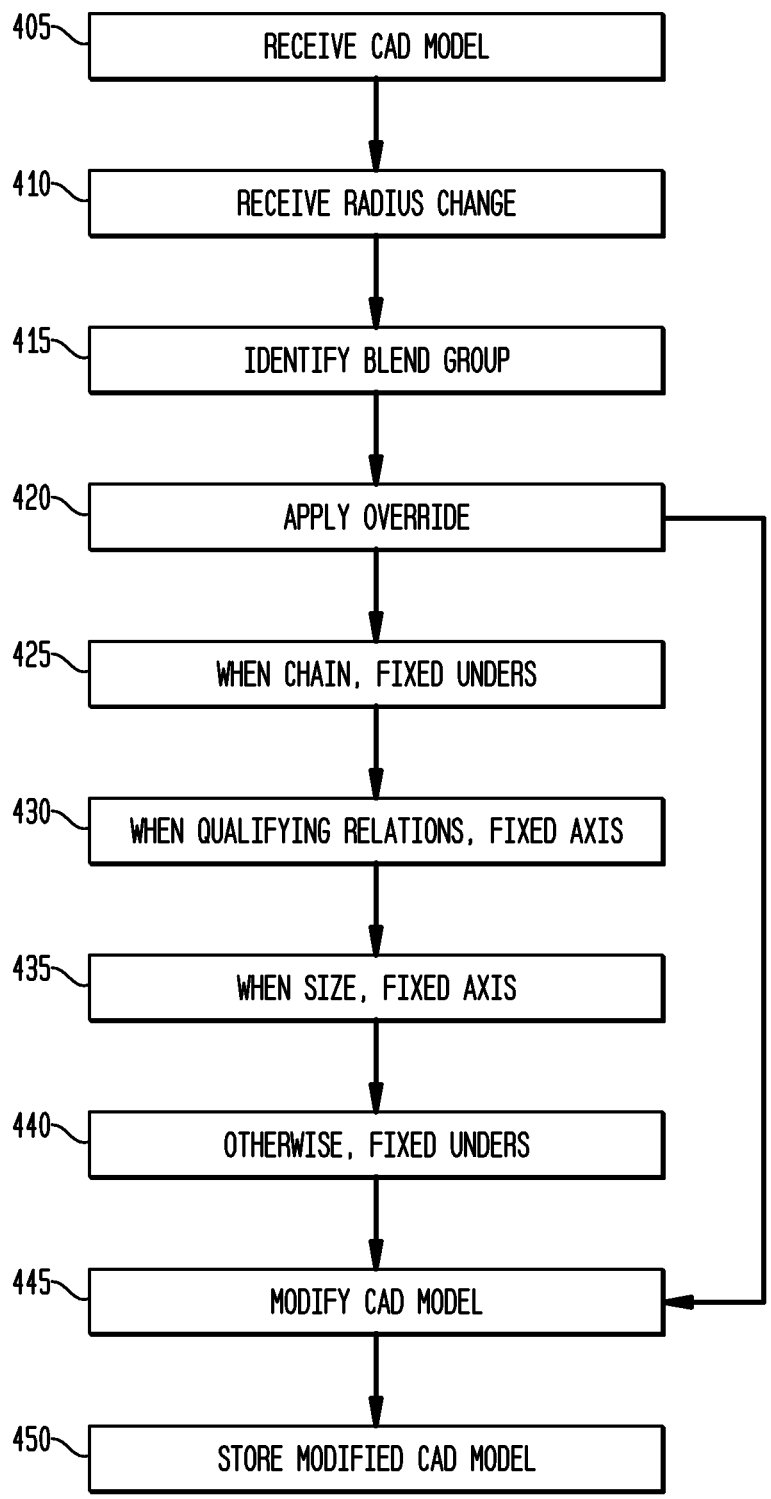
FIG. 4 depicts a flowchart of a process in accordance with disclosed embodiments.

FIG. 4 depicts a process in accordance with disclosed embodiments, that can be performed, for example, by one or more PDM data processing systems such as data processing system 100, referred to generically below as the "system".

The system receives a CAD model (step 405). This can be a 2D or 3D model, and the model includes a plurality of features including at least a first blend that has an axis, a radius measured from the axis, and a plurality of unders. Receiving, as used herein, can include loading from storage, receiving from another device or process, receiving via an interaction with a user, or otherwise.

The system receives a change to the radius of the first blend (step 410). This can include receiving an edit from a user, and can be caused indirectly by the presence of dimensions and constraints that serve to link a non-radius change input, such as a simple translation, into a radius change on a connected blend. The change can be an explicit command to change the radius, a dimension edit, or otherwise.

The system can identify a blend group including the first blend and any other blends in the model that should be processed with the first blend (step 415). This step can include identifying other blends that have the same radius change, and processing those blends together as described herein. This can include identifying other blends connected via a relationship with the first blend, the relationships including identical, pattern, symmetry, shell. If no other blends are identified in this step, then the blend group includes only the first blend.

When there is a consistent override on members of the blend group, such as one or more overrides of the same type on members of the group, then the system uses the override by designating a fixed axis or fixed unders as specified by the override (step 420). If there is an override, then the system can skip to step 445.

When any of the blends in the blend group have a chain property, then the system designates the unders as fixed (step 425). This occurs when any of the blends in the group is part of a chain, such as illustrated above in the example of FIG. 3D.

When any of the blends in the blend group have qualifying relations property, then the system designates the axis as fixed (step 430). This excludes a qualifying relations property wholly between the blends in the blend group itself. Such a case is illustrated above with respect to FIG. 3B.

When any of the blends in the blend group have a size property, then the system designates the axis as fixed (step 435). Such a case is illustrated in the example of FIG. 3C above. The size property occurs when a blend in the blend group is more than N times larger than a mutually dependent neighbor blend, where N is greater than one. "N" is selectable and changeable; a typical value for the size property is 8, where a blend in the blend group is more than 8 times larger than a mutually dependent neighbor blend.

Otherwise, if the axis is not designated as fixed by a previous condition, the system designates the unders as fixed (step 440). Such a case is illustrated, for example in FIG. 3A.

Steps 420-440 can generically be described as selectively designating either the axis as fixed or the unders as fixed according to a property of the blend.

The system modifies the model by changing the blend radius according to the received change and the designated fixed axis or designated fixed unders (step 445).

The system stores the modified model (step 450). The system can also display the modified model.

In other embodiments, where there is a very large radius blend, there may come a point when fixing the axis is no longer sensible. In such a case, the system can instead designate the unders as fixed, or can designate the two points of tangency between the axis and unders as fixed without fixing either the axis or the unders directly. That is, in the example of FIG. 2A, points of tangency 214 and 216 can be designated as fixed, and both the unders 204 and 206 and the axis 208 can be allowed to move.

Of course, those of skill in the art will recognize that, unless specifically indicated or required by the sequence of operations, certain steps in the processes described above may be omitted, performed concurrently or sequentially, or performed in a different order. Any of the other features and processes described above can be included in the process of FIG. 4.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by a data processing system and comprising:
   receiving a CAD model in the data processing system, the CAD model including at least a first blend that has an axis, a radius measured from the axis, and a plurality of unders;
   receiving a change to the radius of the first blend;
   selectively designating either the axis as fixed or the unders as fixed according to a property of the blend;
   modifying the CAD model by changing the radius according to the received change and the designated fixed axis or designated fixed unders while maintaining points of tangency at intersections between the unders and the first blend; and
   storing the modified CAD model.

2. The method of claim 1, wherein the data processing system identifies a blend group including the first blend and any other blends in the model to be processed with the first blend.

3. The method of claim 2, wherein the axis is designated as fixed when any of the blends in the blend group have qualifying relations property or a size property.

4. The method of claim 2, wherein the unders are designated as fixed when any of the blends in the blend group have a chain property.

5. The method of claim 2, wherein the unders are designated as fixed when the axis has not been designated as fixed.

6. The method of claim 2, wherein identifying a blend group includes identifying other blends that have the same radius change as the first blend and other blends each connected via a respective relationship with the first blend, the respective relationships including identical, pattern, symmetry, shell.

7. The method of claim 1, wherein an override designates the axis as fixed or the unders as fixed.

8. A data processing system comprising:
a processor; and
an accessible memory, the data processing system particularly configured to
receiving a CAD model in the data processing system, the CAD model including at least a first blend that has an axis, a radius measured from the axis, and a plurality of unders;
receiving a change to the radius of the first blend;
selectively designating either the axis as fixed or the unders as fixed according to a property of the blend;
modifying the CAD model by changing the radius according to the received change and the designated fixed axis or designated fixed unders while maintaining points of tangency at intersections between the unders and the first blend; and
storing the modified CAD model.

9. The data processing system of claim 8, wherein the data processing system identifies a blend group including the first blend and any other blends in the model to be processed with the first blend.

10. The data processing system of claim 9, wherein the axis is designated as fixed when any of the blends in the blend group have qualifying relations property or a size property.

11. The data processing system of claim 9, wherein the unders are designated as fixed when any of the blends in the blend group have a chain property.

12. The data processing system of claim 9, wherein the unders are designated as fixed when any of the blends in the blend group have a chain property.

13. The data processing system of claim 9, wherein identifying a blend group includes identifying other blends that have the same radius change as the first blend and other blends each connected via a respective relationship with the first blend, the respective relationships including identical, pattern, symmetry, shell.

14. The data processing system of claim 8, wherein an override designates the axis as fixed or the unders as fixed.

15. A non-transitory computer-readable medium encoded with executable instructions that, when executed, cause one or more data processing systems to:
receiving a CAD model in the data processing system, the CAD model including at least a first blend that has an axis, a radius measured from the axis, and a plurality of unders;
receiving a change to the radius of the first blend;
selectively designating either the axis as fixed or the unders as fixed according to a property of the blend;
modifying the CAD model by changing the radius according to the received change and the designated fixed axis or designated fixed unders while maintaining points of tangency at intersections between the unders and the first blend; and
storing the modified CAD model.

16. The computer-readable medium of claim 15, wherein the data processing system identifies a blend group including the first blend and any other blends in the model to be processed with the first blend.

17. The computer-readable medium of claim 16, wherein the unders are designated as fixed when the axis has not been designated as fixed.

18. The computer-readable medium of claim 16, wherein the axis is designated as fixed when any of the blends in the blend group have qualifying relations property or a size property.

19. The computer-readable medium of claim 16, wherein the unders are designated as fixed when any of the blends in the blend group have a chain property.

20. The computer-readable medium of claim 16, wherein identifying a blend group includes identifying other blends that have the same radius change as the first blend and other blends each connected via a respective relationship with the first blend, the respective relationships including identical, pattern, symmetry, shell.

* * * * *